(12) United States Patent
Beckmann et al.

(10) Patent No.: US 6,794,071 B2
(45) Date of Patent: Sep. 21, 2004

(54) APPARATUS AND METHOD FOR RAPIDLY INCREASING POWER OUTPUT FROM A DIRECT OXIDATION FUEL CELL

(75) Inventors: Gerhard Beckmann, Altamount, NY (US); William W. Dailey, Loudonville, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 80 days.

(21) Appl. No.: 09/881,489

(22) Filed: Jun. 14, 2001

(65) Prior Publication Data

US 2002/0192517 A1 Dec. 19, 2002

(51) Int. Cl.[7] .............................................. H01M 8/04
(52) U.S. Cl. .......................... 429/23; 429/12; 429/32; 429/40
(58) Field of Search ................... 429/12, 13, 23, 429/32, 40

(56) References Cited

U.S. PATENT DOCUMENTS

| | | |
|---|---|---|
| 4,673,624 A | 6/1987 | Hockaday |
| 4,810,597 A | 3/1989 | Kumagai et al. |
| 4,904,548 A | 2/1990 | Tajima |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |
| 5,925,476 A * | 7/1999 | Kawatsu ...................... 429/24 |
| 5,945,231 A | 8/1999 | Narayanan et al. |
| 5,992,008 A | 11/1999 | Kindler |
| 6,265,093 B1 * | 7/2001 | Surampudi et al. ........... 429/13 |
| 6,296,964 B1 | 10/2001 | Ren et al. |
| 6,350,540 B1 * | 2/2002 | Sugita et al. ................. 429/39 |
| 6,356,433 B1 | 3/2002 | Shi et al. |
| 6,420,059 B1 * | 7/2002 | Surampudi et al. ........... 429/13 |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shinshon Gottesfeld and Mahlon S. Wilson, pp. 487–517.
International Search Report for International application No. PCT/US02/17980, Filed Jun. 7, 2002, all pages.
Ren, Xiaoming et al., Methanol Cross–Over in Direct Methanol Fuel Cells, Electronic and Electrochemical Materials and Devices, MST–11, MS–D429, Los Alamos, NM, pp. 284–293.

* cited by examiner

*Primary Examiner*—Dah-Wei Yuan
(74) *Attorney, Agent, or Firm*—Cesari and McKenna, LLP

(57) ABSTRACT

A direct oxidation fuel cell which rapidly increases output power in response to demand. A conduit and valve arrangement allows neat or concentrated fuel to be introduced directly into anode flow field plate effectively bypassing the normal, time-consuming fuel flow path and eliminating the accompanying delay. A controller senses the demand for power and opens or closes the valves as appropriate. In alternative embodiments, neat or concentrated fuel is supplied directly to the anode diffusion layer or a protonically conductive membrane.

12 Claims, 10 Drawing Sheets

APPARATUS AND METHOD FOR RAPIDLY INCREASING POWER OUTPUT FROM A DIRECT OXIDATION FUEL CELL

BACKGROUND OF THE INVENTION

1. Field of the Invention

The present invention relates generally to the field of fuel cells and, more specifically, to an arrangement for rapidly increasing power output from a direct oxidation fuel cell through the introduction of neat or concentrated fuel to the cell's anode flow field channel, anode diffusion layer or protonically-conductive membrane.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel systems may be divided into "reformer-based" (i.e., those in which the fuel is processed in some fashion before it is introduced into the cell) or "direct oxidation" in which the fuel is fed directly into the cell without internal processing. Most currently available fuel cells are of the reformer-based type, but fuel-processing requirements for such cells limits the applicability of those cells to relatively large systems.

Direct oxidation fuel cell systems may be better suited for a number of applications such as smaller mobile devices (i.e., mobile phones, handheld and laptop computers), as well as in larger applications. One example of a direct oxidation system is the direct methanol fuel cell system or DMFC. In a DMFC, the electrochemical reaction at the anode is a conversion of methanol and water to $CO_2$, $H^+$ and $e^-$. More specifically, a liquid carbonaceous fuel solution (typically an aqueous methanol solution) is applied to a protonically-conductive (but electronically non-conductive) membrane (PCM) directly using a catalyst on the membrane surface to enable direct oxidation of the hydrocarbon on the anode. The hydrogen protons are separated from the electrons and the protons pass through the PCM, which is impermeable to the electrons. The electrons thus seek a different path to reunite with the protons and travel through a load, providing electrical power.

The reactions that generate electrical power occur nearly instantaneously when fuel is applied to the PCM, as long as the load draws electricity from the fuel cell. However, presently available PCMs are permeable to methanol, allowing methanol to pass from the anode face of the PCM, to the cathode face of the PCM, where the methanol is oxidized upon contact with air without generating electricity. This phenomenon is known as "methanol crossover." However, by introducing methanol in an aqueous solution, methanol crossover is minimized. This water and methanol mixture provides a sufficient amount of methanol to provide power to the load under low power demand conditions, while the water prevents excess methanol crossover from occurring. However, if power demand is high, or increases rapidly, there may be insufficient methanol in the aqueous methanol solution to provide sufficient power to the load in an acceptable time period.

The carbon dioxide, which is essentially a waste product, is separated from the remaining methanol fuel mixture before such fuel is re-circulated. In an alternative usage of the carbon dioxide this gas can be used to passively pump liquid methanol into the feed fuel cell. This is disclosed in U.S. patent application Ser. No. 09/717,754, filed on Dec. 8, 2000, for a PASSIVELY PUMPED LIQUID FEED FUEL CELL SYSTEM, which is commonly owned by the assignee of the present invention, and which is incorporated by reference herein in its entirety.

Substantial research has been dedicated to development of DMFC systems for use in portable electronics in recent years. However, present DMFC system designs are not able to meet the power demand profiles required for portable electronics while satisfying the desired form factors. In other words, the electrical power demand of current generation portable electronic devices (as well as the power needs of future portable electronics) may change very quickly, depending on their operating state, whereas present DMFC designs are not able to increase or decrease their power output rapidly, due to the fact that sufficient fuel is not available from the dilute fuel mixture. While it is possible to increase or decrease the concentration of methanol in the fuel mixture within the pump (or other mixing apparatus) being applied to the membrane electrode assembly (MEA) of a DMFC in response to power demands, there is an unacceptable delay between the time that power is demanded and the response of the DMFC. The delay is primarily attributable to the time that it takes to add more concentrated fuel from a fuel source to the fuel mixture, the time that it takes for the more concentrated fuel to be disseminated into the fuel mixture within the pump, and the time required to transport additional fuel through the system and to the PCM through the diffusion layer.

It is common practice to increase the voltage level of a DMFC system by connecting several fuel cells together as a series electrical circuit. One method of creating such an electrical connection is to fabricate a "stack" of DMFCs whereby a bipolar plate is placed in physical contact with the cathode flow field plate of a first cell and the anode flow field plate of a second cell. By doing so, the voltage output of the DMFC system is in creased arithmetically, thus providing increased power output to meet the demands of a power application.

In order to provide a more rapid response time, some current designs envision electrically coupling the DMFC with a capacitor or battery to meet the instantaneous power demands of a given application. However, such an approach requires additional components and connection, making control of the system more complicated, and presents increased difficulty in manufacturing on a commercial scale. In addition, each of these components has performance shortcomings based on the limitations of the technologies including, but not limited to recharge time and life cycle of each.

SUMMARY OF THE INVENTION

In brief summary, the present invention provides a direct oxidation fuel cell system in which the output power level may be increased rapidly to meet the power demands of a desired application, including typical portable electronic devices. In accordance with a preferred embodiment of the invention, an alternative fuel flow path is provided between a fuel source and an anode flow field plate. By actuating one or more valves, neat or concentrated fuel may be introduced into the flow field channels from which it diffuses through the diffusion layer and is introduced to the PCM. Because the alternative fuel flow path effectively bypasses the normal fuel flow path, the time delay until power output increases is greatly reduced.

In accordance with a second embodiment of the invention, an alternative fuel flow path is provided between a fuel source and the anode diffusion layer of the fuel cell. Again, by actuating one or more valves, neat or concentrated fuel may be introduced into the diffusion layer, decreasing the time delay between the demand for power and the increased generation of power. The time delay may be further shortened by delivering the concentrated fuel to the diffusion layer via a pump or pressurized vessel, thus providing a greater diffusion rate within the diffusion layer.

In accordance with a third embodiment of the invention, an alternative fuel flow path is provided from the fuel source to the PCM. Because the alternative fuel flow path effectively bypasses the normal fuel flow path and anode diffusion layer, the time delay until power output increases is greatly reduced.

The present invention may minimize or eliminate the need for batteries or capacitors, thereby simplifying the overall system structure, improving manufacturability, and reducing cost, volume and weight.

BRIEF DESCRIPTION OF THE DRAWINGS

The invention description below refers to the accompanying drawings, of which.

DETAILED DESCRIPTION OF AN ILLUSTRATIVE EMBODIMENT

For purposes of illustration, we herein describe an illustrative embodiment of the invention as it is employed in connection with a DMFC system, with the fuel substance being methanol or an aqueous methanol solution. It should be understood, however, that it is within the scope of the present invention that the invention described herein can be readily used for other fuels in direct oxidation fuel cells. Thus, as used herein, the word "fuel" shall include methanol, ethanol, propane, butane or combinations thereof, and aqueous solutions thereof and other carbonaceous fuels amenable to use in a direct oxidation fuel cell system.

Figure 1:
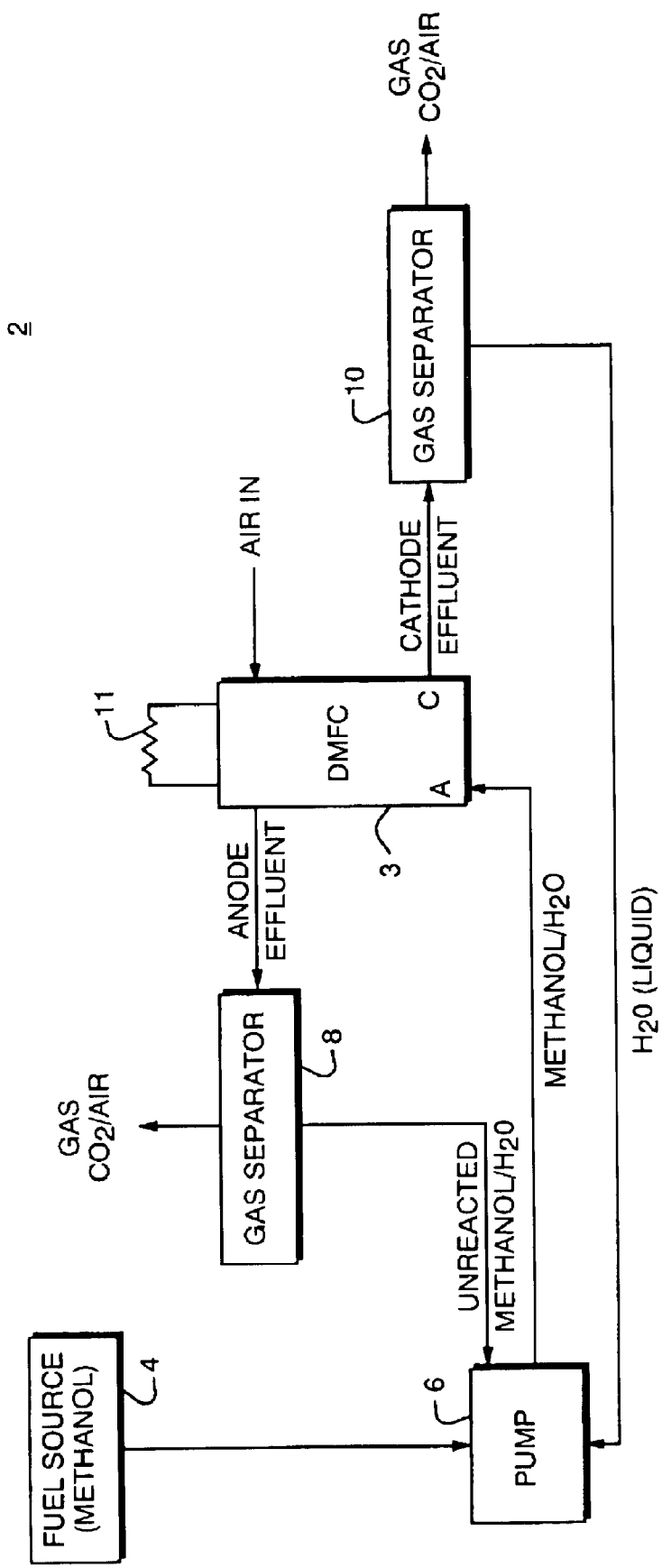
FIG. 1 is a block diagram of a direct methanol fuel cell system known in the prior art.

FIG. 1 shows a direct methanol fuel cell system 2. For a better understanding of the present invention, the system 2 will be briefly described. The system 2 contains a direct methanol fuel cell (DMFC) 3 and a fuel source 4.

Methanol or a solution of methanol and water is introduced, via a pump (or other apparatus) 6, to the anode side (A) of DMFC 3. Alternatively, fuel may be drawn from source 4 and used to fill a reservoir (not shown) from which pump 6 may draw. Oxidizing agent, preferably ambient air is introduced into the cathode side (C) of DMFC 3. An electrical load 11 is connected between the anode and cathode of DMFC 3.

Pump 6 is coupled to DMFC 3, a first gas separator 8 and a second gas separator 18. Gas separator 8 receives effluent from the anode of DMFC 3 and separates it into liquid (i.e., unreacted methanol or methanol and water) and gas (i.e., carbon dioxide) components. The liquid component is supplied to pump 6 for recirculation to DMFC 3. The gas component may be vented, as shown, or may be used to drive pump 6 in accordance with the teachings of commonly-owned U.S. patent application Ser. No. 09/717, 754.

Gas separator 10 receives effluent from the cathode of DMFC 3 and separates it into a gas component ($CO_2$ or air) and a liquid component (water). The liquid component is fed back to pump 6 for recirculation to DMFC 3, or is removed or evaporated into the ambient environment.

Figure 2:
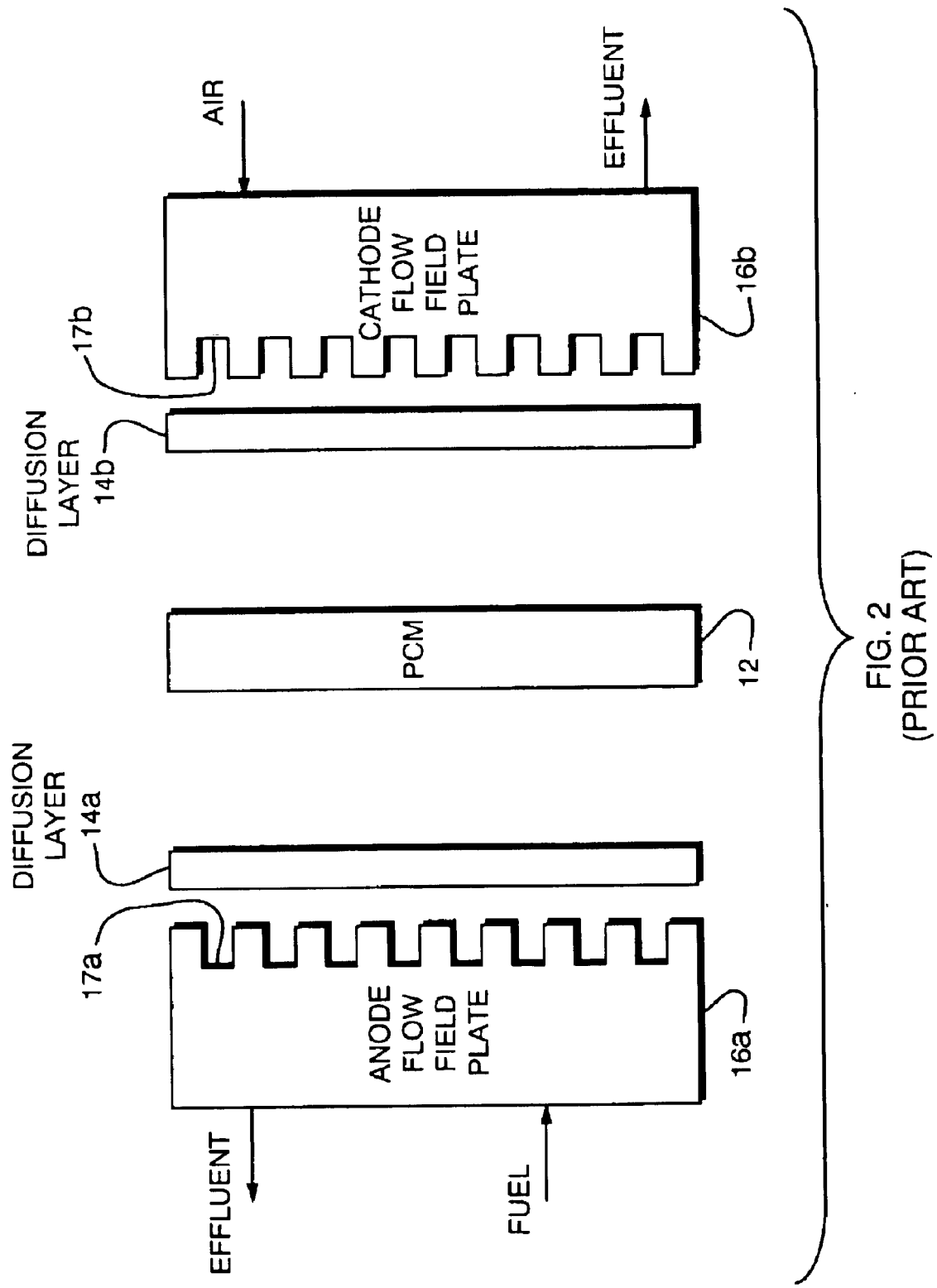
FIG. 2 is a block diagram of a portion of the internal construction of the direct methanol fuel cell shown in FIG. 1.

FIG. 2 shows a portion of the internal construction of DMFC 3. A protonically conductive membrane (PCM) 12 is disposed between two diffusion layers 14a, 14b. An anode flow field plate 16a is adjacent to diffusion layer 14a. A cathode flow field plate 16b is adjacent to diffusion layer 14b. Flow field plates 16a, 16b provide one or more channels 17a, 17b, respectively, through which reactants and byproducts may flow to or from the associated diffusion layers. Channels 17a, 17b are often constructed as long, serpentine paths which work to disperse the fuel mixture slowly and evenly over diffusion layer 14a. It should be understood that the structures in FIG. 2 are normally pressed together in close contact when assembled.

PCM 12 is preferably constructed from a commercially available material, such as those sold by E. I. DuPont de Nemours and Company under the trademark Nafion®, which has been coated with a catalyst such as platinum or platinum and ruthenium. Diffusion layers 14a, 14b are preferably constructed from carbon impregnated paper or cloth, each of which is commercially available from the ETEK division of De Nora, but may be fabricated from a variety of other materials. Flow field plates 16a, 16b are used to control the reactants as they are distributed to the PCM, and may be constructed using conventional manufacturing techniques, MEMS, thin film or other fabrication methods known to those skilled in the art.

In order for fuel to reach PCM 12 where it may be oxidized, the fuel must travel from fuel source 4, through pump 6 (or possibly a reservoir), anode flow field plate 16a and diffusion layer 14a. Consequently, when DMFC 3 experiences a rapid increase in demand for power, an unacceptable occurs before sufficient fuel reaches PCM 12 and oxidizes and power output increases.

Figure 3:
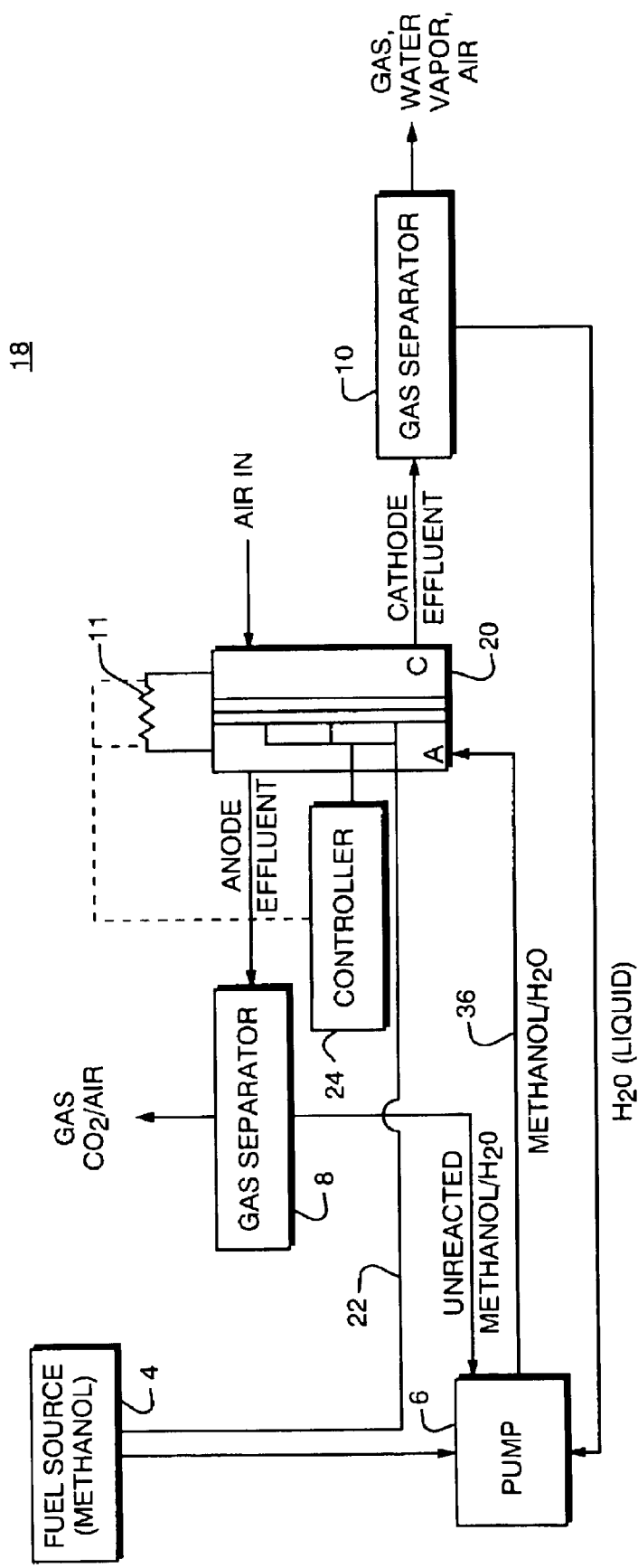
FIG. 3 is a block diagram of a direct methanol fuel cell system constructed in accordance with a preferred embodiment of the present invention.
Figure 4:
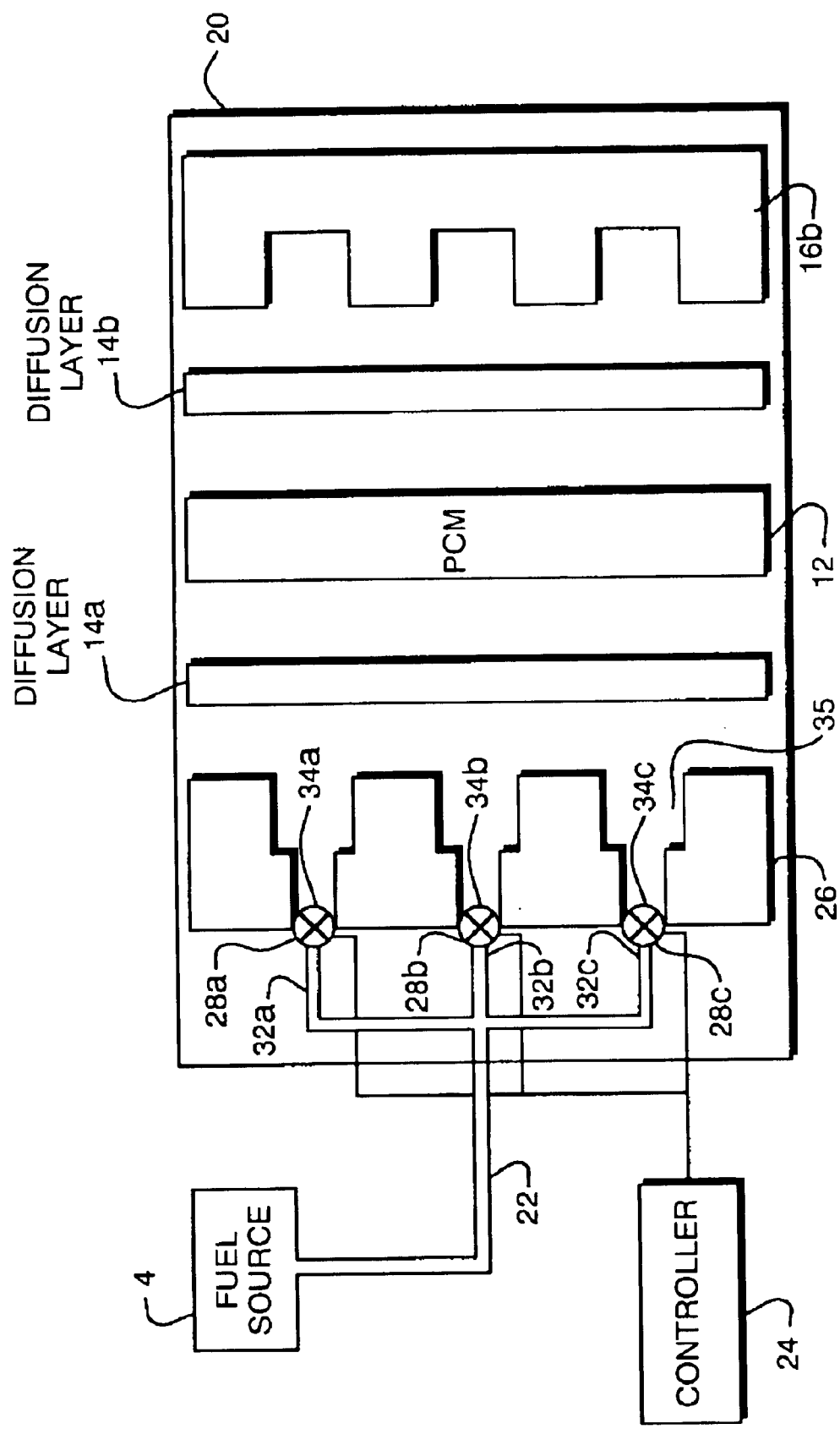
FIG. 4 is a greatly enlarged schematic cross-section of a portion of the internal construction of the direct methanol fuel cell shown in FIG. 3.

FIGS. 3 and 4 show a direct methanol fuel cell system 18 constructed in accordance with a preferred embodiment of the present invention. For purposes of improved clarity, like components which were introduced earlier are denoted by the same reference numbers previously used. In system 22, a DMFC 20 is connected such that it may receive fuel via pump 6 as well as directly from fuel source 4 via a conduit 22. More specifically, conduit 22 is connected to supply neat or concentrated fuel directly to anode flow field plate 26 within DMFC 20. A controller 24 is coupled to anode flow field plate 26 and load 11.

If desired or necessary to meet the requirements of a particular application, fuel 15 source 4 may be implemented using a pressurized vessel or may incorporate a pump to generate sufficient pressure to deliver fuel through conduit 22.

As shown in FIG. 4, conduit 22 may divide into a series of branches 32a–32c, each branch having an associated valve 28a–28c, respectively. It will be understood by those skilled in the art that the number of conduits or branches per conduit may be varied to meet the requirements of a particular application. Anode flow field plate 26 is provided with a plurality of apertures 34a–34d which extend through that plate into a flow field channel 35. Thus, neat or concentrated fuel which flows out of valves 28a–28c effectively bypasses pump 6, fuel mixture conduit 36, anode flow field plate 26, and enters flow field channel 35 . . . By doing so, the concentration of fuel in the aqueous in the flow field channel 35 increases, thus introducing a fuel mixture that will increase the electricity generated more quickly.

Conduit 22, valves 28a–28c and branches 32a–32c are preferably constructed using MEMS techniques or other well known conventional techniques. Apertures 34a–34d are preferably formed by punching, drilling or otherwise perforating anode flow field plate 26. Controller 24 may be implemented in any of a variety of ways including an appropriately programmed microprocessor or microcontroller, or other suitable circuitry.

With continuing reference to FIGS. 3 and 4, the overall operation of system 18 will be described. Controller 24 senses the power demanded by load 11. During periods when the demand for power is not rapidly increasing, dilute fuel mixture is supplied to DMFC 18 by pump 6 only through conduit 36. As discussed above, such fuel may be an aqueous solution produced by the pump's mixing of neat or concentrated fuel from fuel source 4 with water received from gas separator 10. Conversely, when a rapid increase in power demand is sensed by controller 24, the controller opens one or more of valves 32a–32c, thereby allowing neat or concentrated fuel to bypass pump 6, anode flow field plate 26. As a result, an increased volume of neat or concentrated fuel reaches diffusion layer 14a almost immediately, the amount of fuel within the diffusion layer is increased providing additional fuel for the necessary reactions, and increased methanol is delivered to the PCM, accordingly the output power level of DMFC 18 begins to rise as additional fuel is consumed.

Figure 5:
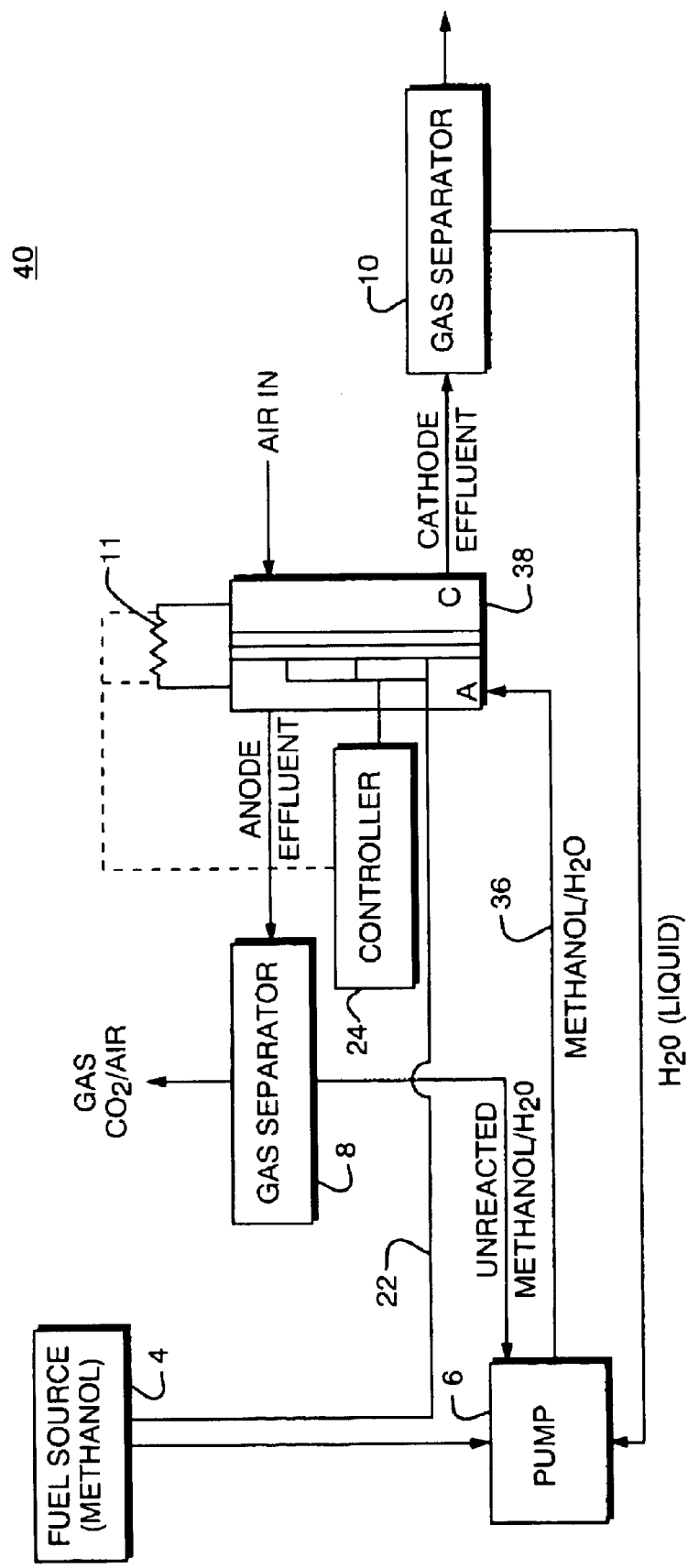
FIG. 5 is a block diagram of a direct methanol fuel cell system constructed in accordance with an alternative embodiment of the present invention.
Figure 6:
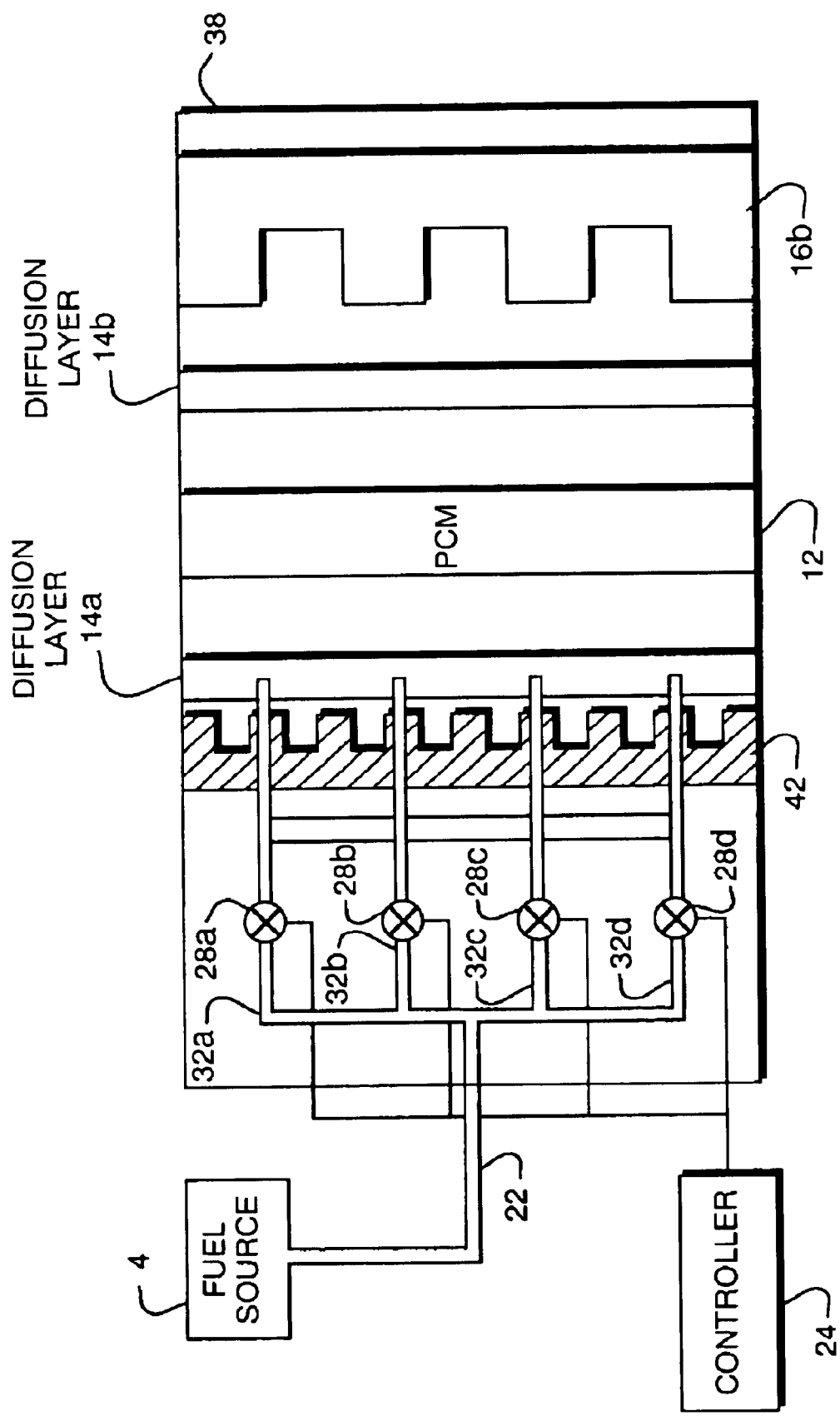
FIG. 6 is a greatly enlarged schematic cross-section of a portion of the internal construction of the direct methanol fuel cell shown in FIG. 5.
Figure 7:
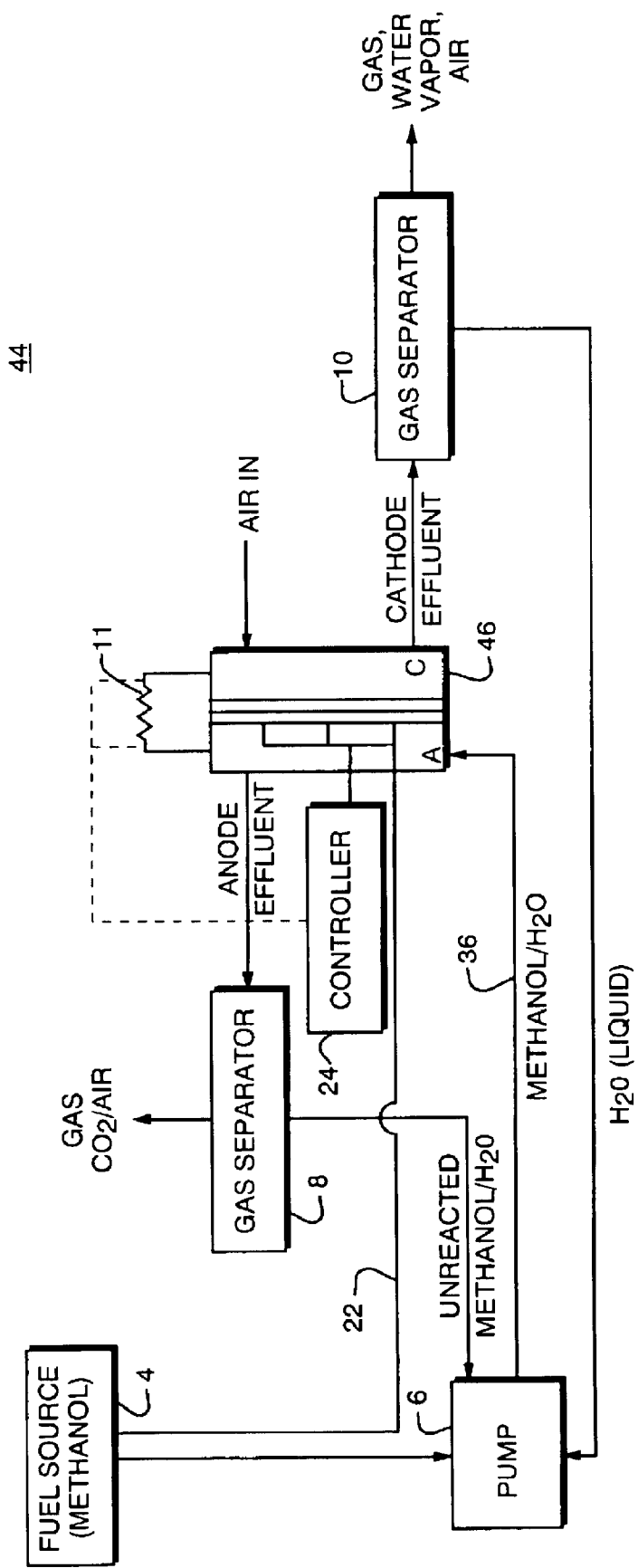
FIG. 7 is a block diagram of a direct methanol fuel cell system constructed in accordance with a preferred embodiment of the present invention.
Figure 8:
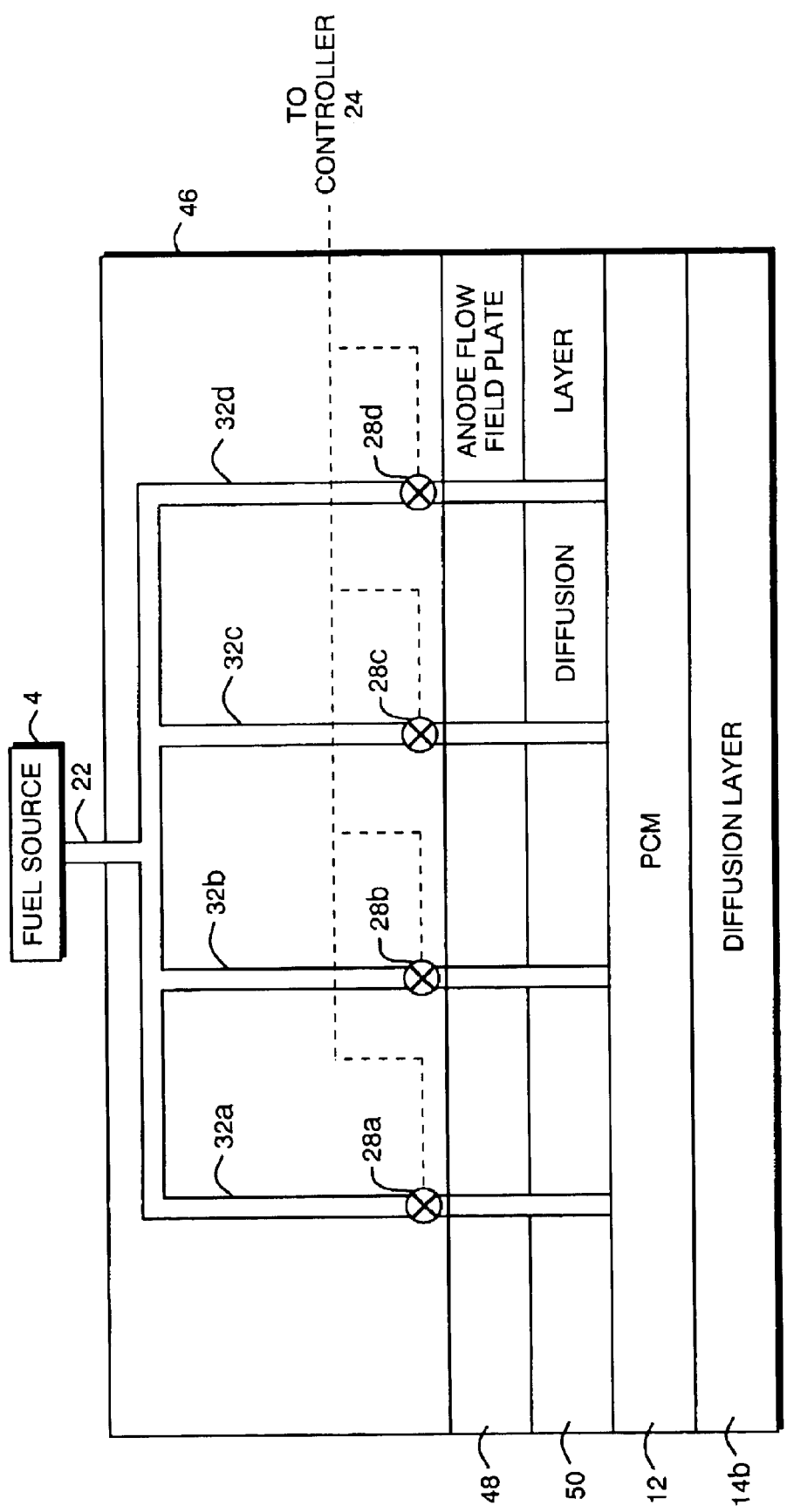
FIG. 8 is a greatly enlarged, schematic, cross-section of a portion of the internal construction of the direct methanol fuel cell shown in FIG. 7.

FIGS. 5 and 6 show an alternative embodiment of the present invention in which a direct methanol fuel cell system 40, similar in architecture to system 18 (FIG. 3), includes a DMFC 38. However, in this embodiment, branches 32a–32d extend beyond valves 28a–28d, respectively, through the thickness of anode flow field plate 42 and into diffusion layer 14a. Thus, during periods of rapidly increasing power demand, controller 24 may actuate one or more of valves 28a–28d, thereby allowing neat or concentrated fuel to bypass both pump 6 and anode flow field plate 42. The concentrated fuel mixture passes through that portion of the anode diffusion layer 14a between the terminal portion of the branch, diffuses through a portion of diffusion layer, and reaches the PCM. Ceteris paribus, there is a direct correlation between the distance of the diffusion layer through which the neat or concentrated fuel must pass, and the time that it takes for the fuel to reach the PCM, and therefore the time for the DMFC system to respond to an increase in the demand for power. As such, by introducing the neat or concentrated fuel into the diffusion layer, the response time is decreased.

FIGS. 7, 8 and 9A–9B show a second alternative embodiment of the present invention in which a direct methanol fuel cell system 44, similar in architecture to system 18 (FIG. 3), includes a DMFC 46. However, in this embodiment, branches 32a–32d extend beyond valves 28a–28d, respectively, through anode flow field plate 48 and diffusion layer 50. During periods of rapidly increasing power demand, controller 24 may actuate one or more of valves 28a–28d, thereby allowing neat or concentrated fuel to bypass pump 6, anode flow field plate 48, and diffusion layer 50, and be applied directly to PCM 12.

Figure 9B:
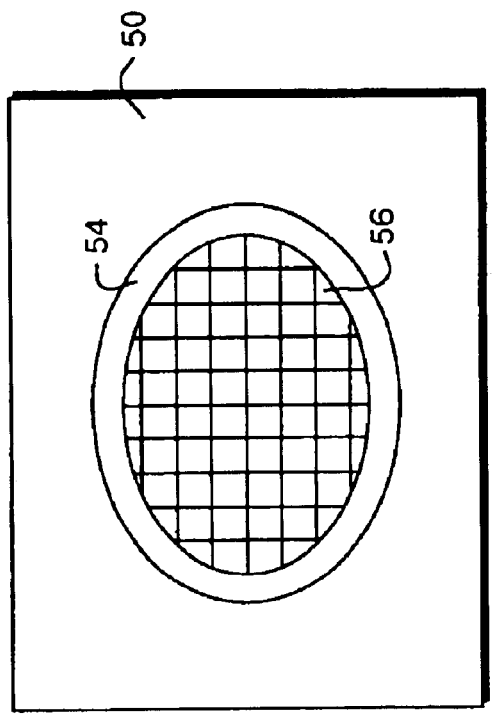
FIG. 9B is an enlarged view of one of the apertures in the anode diffusion layer shown in FIG. 9A.
Figure 9A:
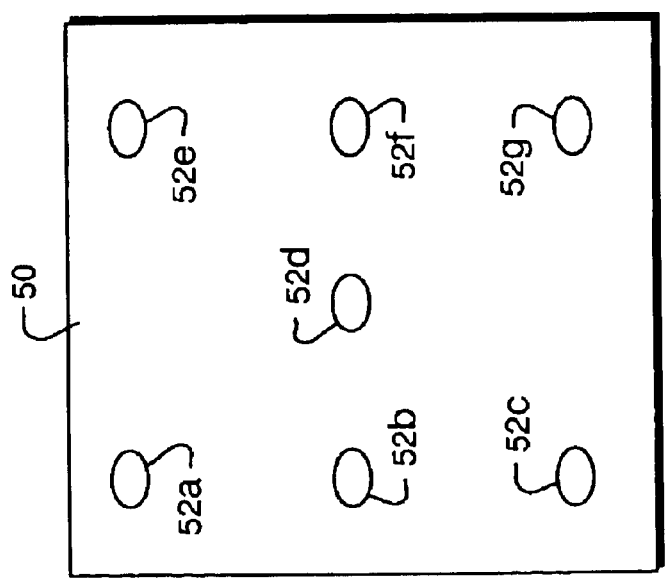
FIG. 9A is a plan view of the anode diffusion layer shown in FIG. 8.

FIG. 9A shows a plan view of anode diffusion layer 50 in which a plurality of apertures 52a–52g are disposed. It will be understood by those skilled in the art that the number of apertures, the size of the apertures and their locations may be varied to meet the needs of a particular application. Also, as shown in FIG. 9B, one or more of the apertures may contain a lining or seal 54. Seal 54 is preferably constructed of a chemically nonreactive material including, but not limited to any number of polymers or plastics, which prevent lateral migration of the concentrated fuel into anode diffusion layer 50, thus delivering a higher volume of fuel to PCM 12 without delays related to the lateral diffusion within the diffusion layer. In order to encourage the conduction of electrons across those areas where PCM 12, is not in contact with anode diffusion layer, it may be necessary to place an electronically conductive mesh 56 or other electronically conductive assembly to provide a path by which electrons may move towards load due to the electrical potential difference.

Figure 10:
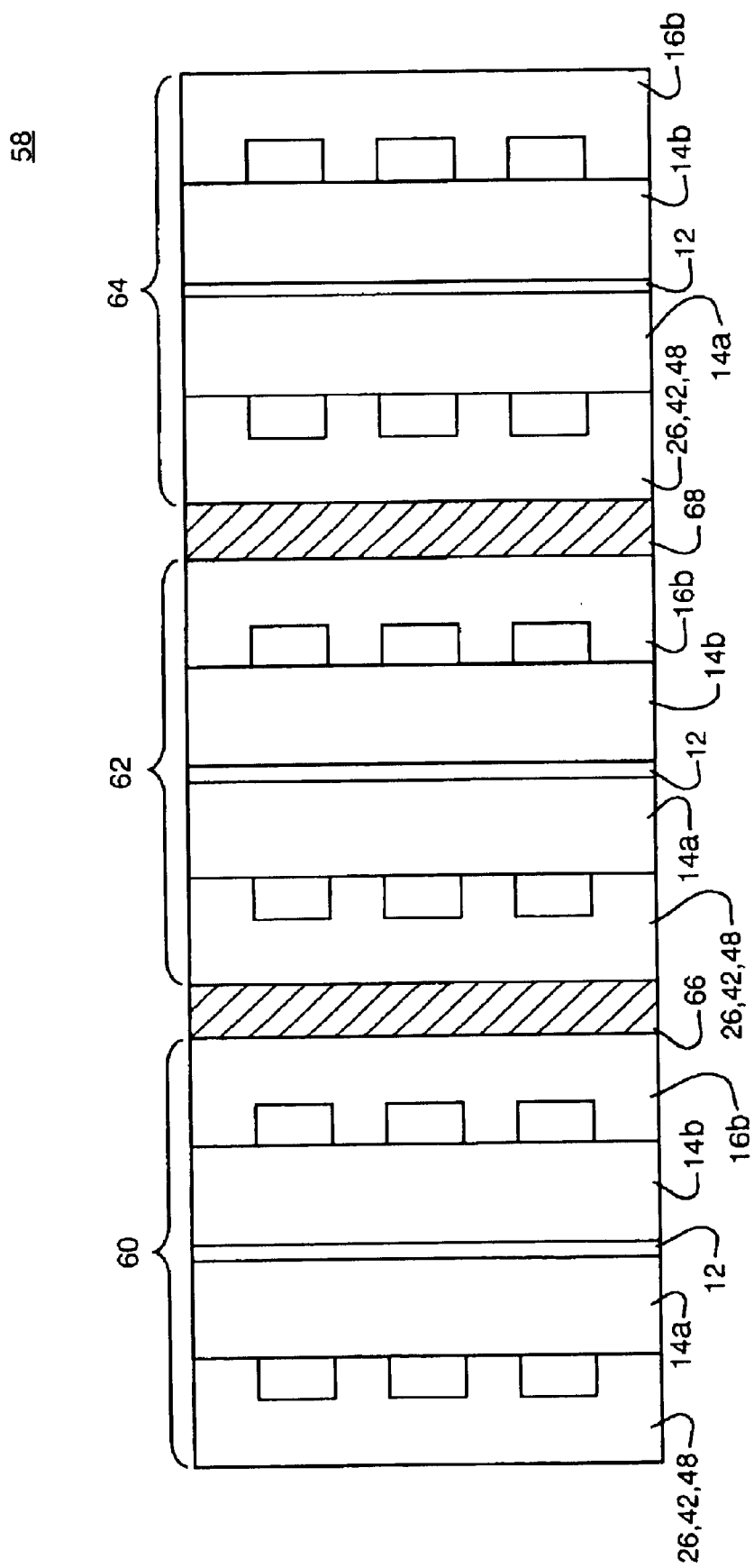
FIG. 10 is a schematic diagram of a fuel cell stack with which one or more of the foregoing embodiments of the invention may be used.

FIG. 10 schematically illustrates a fuel cell "stack" 58 in which three fuel cells 60, 62 and 64 have been connected in series by way of two bipolar plates 66 and 68. Such a stack, or a similar stack having a different number of fuel cells or possibly a combination of different fuel cells, may be used to generate a higher potential than is possible with a single fuel cell and may thus be substituted for any of DMFCs 20, 38 or 46 described above. Specifically, it is any of the embodiments of the invention may be incorporated into one or more of the fuel cells (60, 62, 64) within stack 58 described above.

It will be understood by those skilled in the art that two or more of the foregoing embodiments could be combined in a single system. That is, conduit 22, valves 28a–28d and branches 32a–32d could be arranged such that controller 24 may direct neat or concentrated fuel to any combination of the anode flow field plate, the diffusion layer and PCM.

What is claimed is:

1. A direct methanol fuel cell system comprising:
   a direct methanol fuel cell, including:
   an anode;
   a cathode;
   a membrane electrode assembly including a protonically-conductive membrane having first and second surfaces on which catalysts are disposed, anode and cathode diffusion layers disposed, respectively, on said catalysts;

a source of fuel;

a conduit for delivering a first fuel mixture to an anode aspect of the fuel cell;

a conduit bypassing at least a portion of said first fuel mixture conduit and being coupled to said fuel source and to one or more valves; and a controller coupled to said one or more valves and, responsive to a change in operating conditions of said fuel cell, operating to actuate one or more of said valves to allow a more concentrated fuel to be delivered to said anode.

2. The direct methanol fuel cell system as defined in claim 1 wherein at least one of said conduits extends to a first surface of said anode diffusion layer that is oriented to receive fuel.

3. The direct methanol fuel cell system as defined in claim 1 wherein at least one of said conduits extends into said anode diffusion layer.

4. The direct methanol fuel cell system as defined in claim 1 wherein at least one of said conduits extends though said anode diffusion layer.

5. A diffusion layer for use in a direct oxidation fuel cell comprising:

a layer of material having a first surface which is oriented to receive fuel and a second surface from which diffused fuel passes, said layer including one or more apertures extending from said first surface to said second surface, said one or more apertures for allowing a more concentrated fuel to effectively bypass said diffusion layer wherein said one or more apertures are connected by one or more conduits and one or more valves to a source of concentrated fuel in such as manner that at least a portion of a first fuel mixture conduit is bypassed, and a more concentrated fuel is delivered via said apertures.

6. A diffusion layer for use in a direct oxidation fuel cell comprising:

a layer of material having a first surface which is oriented to receive fuel and a second surface from which diffused fuel passes, said layer including one or more apertures extending from said first surface to said second surface, said one or more apertures for allowing a more concentrated fuel to effectively bypass said diffusion layer wherein said one or more apertures are lined with a material which is substantially impermeable to said fuel, thereby inhibiting said fuel from migrating laterally into said diffusion layer.

7. A membrane electrode assembly for use with a direct oxidation fuel cell, said assembly comprising:

a protonically conductive membrane having first and second surfaces on which catalysts are disposed;

anode and cathode diffusion layers disposed, respectively, on said catalysts, said anode diffusion layer having a first surface which is oriented to receive fuel and a second surface in contact with said catalyst, and one or more apertures extending through the thickness of said anode diffusion layer, said one or more apertures for allowing a more concentrated fuel to effectively bypass said diffusion layer and wherein said one or more apertures are connected by one or more conduits and one or more valves in such as manner that at least a portion of a first fuel mixture conduit is bypassed.

8. A membrane electrode assembly for use with a direct oxidation fuel cell, said assembly comprising:

a protonically conductive membrane having first and second surfaces on which catalysts are disposed;

anode and cathode diffusion layers disposed, respectively, on said catalysts, said anode diffusion layer having a first surface which is oriented to receive fuel and a second surface in contact with said catalyst, and one or more apertures extending through the thickness of said anode diffusion layer, said one or more apertures for allowing a more concentrated fuel to effectively bypass said diffusion layer and wherein said one or more apertures are lined with a material which is substantially impermeable to said fuel, thereby inhibiting said fuel from migrating laterally into said diffusion layer.

9. A direct methanol fuel cell system comprising:

a direct methanol fuel cell, including:

an anode;

a cathode;

a membrane electrode assembly including a protonically-conductive membrane having first and second surfaces on which catalysts are disposed, anode and cathode diffusion layers disposed, respectively, on said catalysts;

a source of fuel;

a conduit coupled to said fuel source and to one or more valves for delivering fuel to said anode; and a controller coupled to said one or more valves and, responsive to a change in operating conditions of said fuel cell, operating to actuate one or more of said valves to allow a more concentrated fuel to be delivered to said anode wherein at least one of said conduits extends directly to said protonically-conductive membrane.

10. The direct methanol fuel cell system as defined in claim 1 further comprising a pump coupled between said fuel source and said anode for pumping a more concentrated fuel to an associated anode flow field plate.

11. A direct methanol fuel cell system comprising:

a direct methanol fuel cell, including:

an anode;

a cathode;

a membrane electrode assembly including a protonically-conductive membrane having first and second surfaces on which catalysts are disposed, anode and cathode diffusion layers disposed, respectively, on said catalysts;

a source of fuel;

a conduit coupled to said fuel source and to one or more valves for delivering neat or concentrated methanol to said anode; and a controller coupled to said one or more valves and, responsive to a change in operating conditions of said fuel cell, operating to actuate one or more of said valves to allow a more concentrated fuel to be delivered to said anode wherein at least one of said conduits extends directly to said catalyzed surface of the protonically-conducted membrane.

12. A direct oxidation fuel cell system, comprising:

a direct oxidation fuel cell, including:

an anode;

a cathode;

a membrane electrode assembly including a protonically-conductive membrane having first and second surfaces on which catalysts are disposed, anode and cathode diffusion layers disposed, respectively, on said catalysts;

a source of highly concentrated fuel substantially comprised of one or more carbonaceous fuel substances;

a conduit for delivering a first fuel mixture to an anode aspect of the fuel cell;

a conduit bypassing at least a portion of the first fuel mixture conduit and being coupled to said fuel source and to one or more valves for delivering a more concentrated fuel to said anode; and a controller coupled to said one or more valves and, responsive to a change in operating conditions of said fuel cell, operating to actuate one or more of said valves to allow highly concentrated fuel to bypass at least a portion of said first fuel mixture conduit and to be delivered to said anode.

* * * * *

UNITED STATES PATENT AND TRADEMARK OFFICE
CERTIFICATE OF CORRECTION

PATENT NO. : 6,794,071 B2  Page 1 of 1
APPLICATION NO. : 09/881489
DATED : September 21, 2004
INVENTOR(S) : Gerhard Beckmann and William W. Dailey It is certified that error appears in the above-identified patent and that said Letters Patent is hereby corrected as shown below:

Title Page, Item [75] and column 1, line 6, delete "Altamount", add --Altamont--.

Signed and Sealed this

Sixth Day of November, 2007

JON W. DUDAS
*Director of the United States Patent and Trademark Office*